United States Patent [19]
Massie

[11] Patent Number: 5,822,166
[45] Date of Patent: Oct. 13, 1998

[54] DC POWER BUS VOLTAGE TRANSIENT SUPPRESSION CIRCUIT

[75] Inventor: Harold L. Massie, West Linn, Oreg.

[73] Assignee: Intel Corporation, Santa Clara, Calif.

[21] Appl. No.: 759,661

[22] Filed: Dec. 5, 1996

[51] Int. Cl.$^6$ .................................................. H02H 3/22
[52] U.S. Cl. .......................... 361/111; 361/92; 307/87
[58] Field of Search .................... 361/54, 56, 58, 361/88, 90, 91, 92, 111; 307/85–87

[56] References Cited

U.S. PATENT DOCUMENTS 4,528,459  7/1985  Wiegel ........................ 307/86
4,890,002  12/1989  Schornack ..................... 307/87

Primary Examiner—Jeffrey A. Gaffin
Assistant Examiner—Sally C. Medley
Attorney, Agent, or Firm—Kenyon & Kenyon

[57] ABSTRACT

A transient suppression circuit suppresses transients on a dc power bus, extending between a power supply and a load which carries a first voltage having a nominal value, by charging a capacitor to a second voltage greater than the nominal voltage, detecting a threshold at which the first voltage drops below its nominal value by more than a first predetermined amount and coupling energy from the capacitor to the bus to compensate for the drop in voltage in response to detecting the threshold.

28 Claims, 3 Drawing Sheets

DC POWER BUS VOLTAGE TRANSIENT SUPPRESSION CIRCUIT

BACKGROUND OF THE INVENTION

The present invention relates to power buses in general and more particularly to the method and apparatus for suppressing transients on a DC power bus.

Current steps in the load current drawn from a DC voltage bus which is coupled to a power supply result in voltage transients. Power supplies include voltage regulators to account for current changes, but, if the current changes are very fast, as they can be in buses used in computer systems, for example, the bus voltage may go out of the required voltage range before the power supply can compensate for the current changes. In other words, power supplies do not generally respond quickly to load changes.

In the past, there has been an attempt to solve this problem through the use of a large value of capacitance across the power bus to suppress these voltage transients. However, a capacitor with a large value of capacitance also has a large size and takes up a considerable amount of printed circuit board space. Furthermore, the reliability of these large capacitors is low resulting in a lower reliability for the overall system.

SUMMARY OF THE INVENTION

A transient suppression circuit is coupled to suppress transients on a dc power bus which carries a first voltage having a nominal value. A threshold circuit is coupled to the bus and provides an output when the first voltage deviates from the nominal value by more than a predetermined amount. A source of current, which in the illustrated embodiment includes a capacitor charged to a higher voltage than that on the bus is provided. A switch having a control input coupled to the output of the threshold circuit couples the source of current to the bus in response to the output of the threshold circuit.

DETAILED DESCRIPTION

Figure 1:
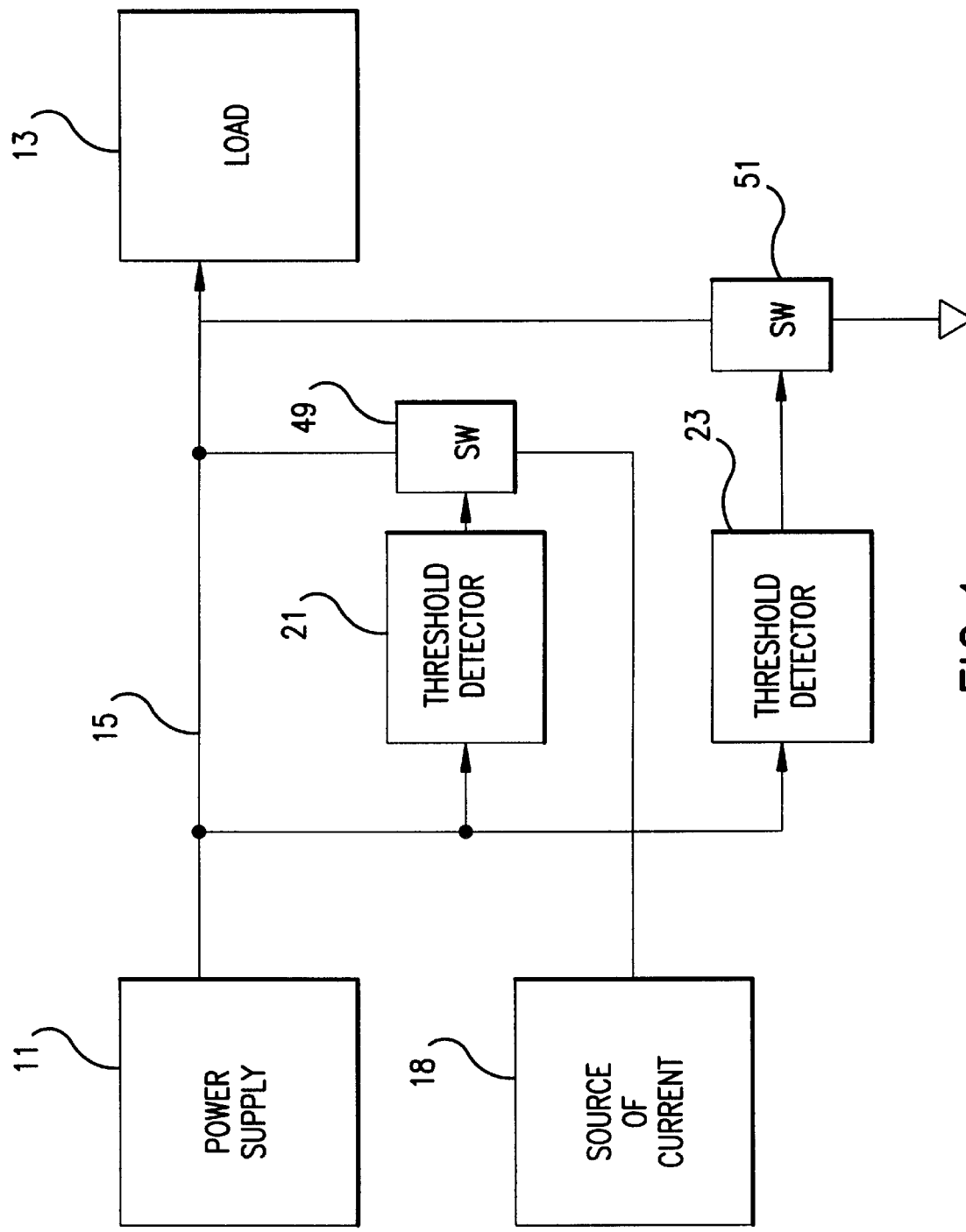
FIG. 1 is a block diagram of an embodiment of a system including a power supply supplying power to a load over a dc bus which also includes an embodiment of a transient suppression circuit according to the present invention.

A block diagram of an embodiment of a system which includes an embodiment of an active transient suppression circuit according to the present invention is shown in FIG. 1. In this embodiment, power is supplied from a power supply 11 to a load 13. As will be discussed below, the load may be a computer system. Although embodiments of the invention used in computer systems are particularly useful, embodiments of circuits according to the present invention can also be used in other applications where the nature of the load is such that current changes occur which are very fast.

The connection between the power supply and the load 13 is a voltage bus 15 carrying a first voltage designated as Vout. Vout has a nominal value referenced to ground for example. As used herein, ground does not necessarily imply earth potential; it is the reference potential for Vout. The voltage Vout may be anyone of a number of different values such as a+5 volt,+3.3 volt or +12 volt, values typically used in computer systems. Of course, it may be any other voltage and will depend on the particular application.

Coupled to the Vout bus 15 is a first threshold detector 21 which has a threshold which is negative or below the nominal value of Vout by a first predetermined value. Also coupled to the bus is a second threshold detector 23 which has a threshold which is positive or above the nominal voltage value by a second predetermined value. Although positive and negative threshold detectors are shown, embodiments of the present invention with only one threshold detector are possible, particularly embodiments with only a negative threshold detector. Each threshold detector provides an output when the first voltage Vout deviates from the nominal value by its associated first or second predetermined amount, respectively.

A source of current 18 is coupled to the bus 15 through a switch 49 which is controlled by the output of the first threshold detector 21. Thus, when the voltage Vout drops below the threshold of threshold detector 21, due to an increase in load, additional current is supplied through the switch. As will be described below, in the embodiment illustrated in FIG. 2, this current is obtained from a capacitor charged to a voltage higher than the nominal value of Vout. Similarly, a switch 51, controlled by the second threshold detector 23, couples the bus 15 to ground when the threshold of the second threshold detector 23 is exceeded, to sink excess current to ground.

Figure 2:
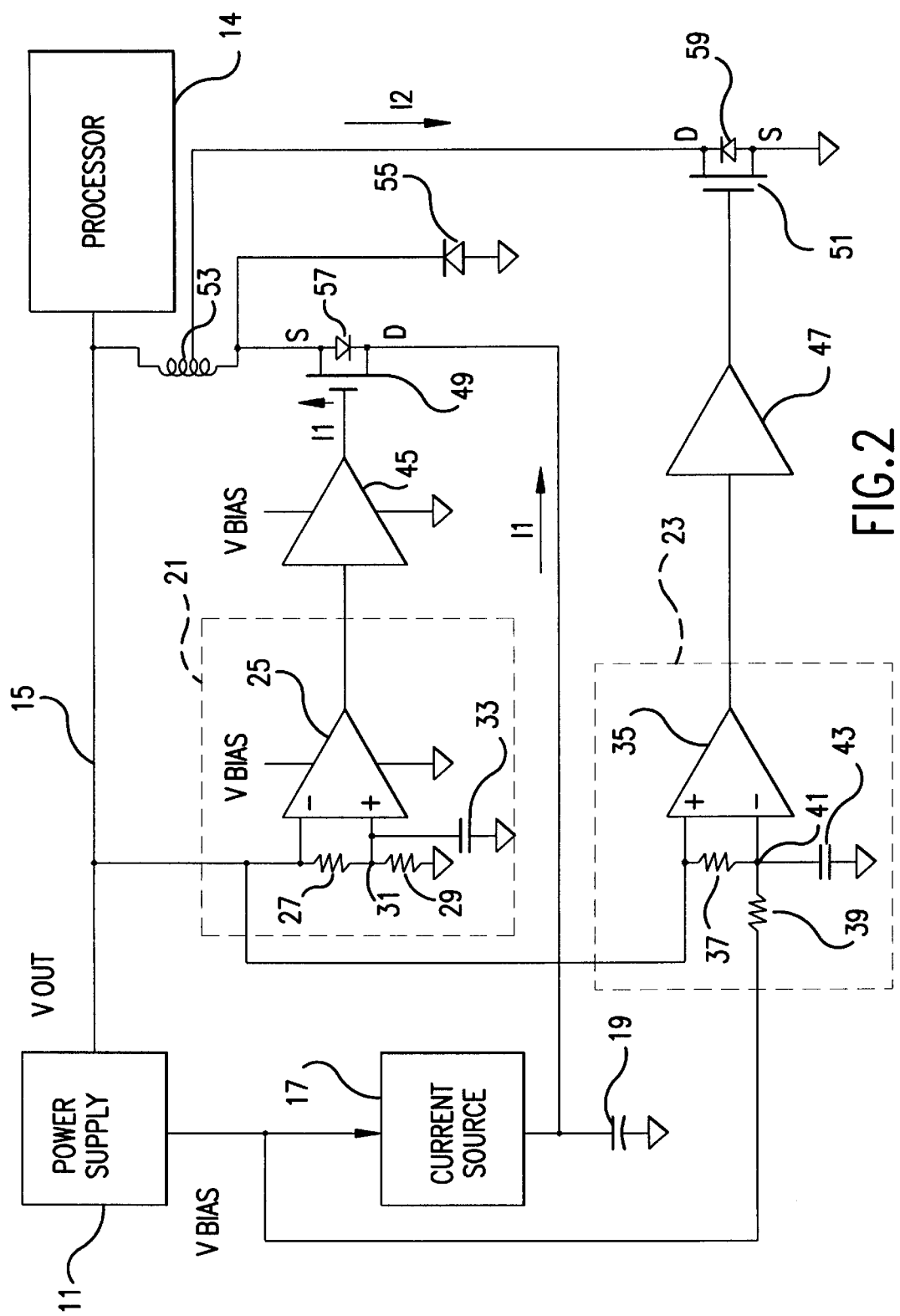
FIG. 2 is a block-circuit diagram of the embodiment of FIG. 1 showing in more detail an embodiment of a dc power bus voltage transient suppression circuit according to the present invention.

FIG. 2 shows a more detailed circuit diagram of an embodiment of the present invention. In the embodiment illustrated in FIG. 2, the load is a processor 14 may include conventional components such as a processor, memory, I/O circuits etc. Particularly in the case of modem high speed processors such as those currently made by Intel Corporation, fast changes in the current required by computer system 13 may occur.

In addition to supplying the output Vout, power supply 11 also supplies a bias voltage Vbias to a current source 17. The voltage Vbias is a higher voltage than the voltage Vout. Current source 17 charges a capacitor 19 to the voltage level of Vbias. This arrangement provides the source of current to be used in responding to an increased load on the bus 15. The current supplied by current source 17 is set to a value that does not overload the voltage Vbias, yet provides the average current required to suppress voltage transients on Vout bus 15.

First threshold detector 21 includes a comparator 25 with non-inverting and inverting inputs, which has the Vbias voltage and ground as its operating voltage. Comparator 25 has its inverting input coupled to Vout. The voltage Vout is also coupled through a voltage divider made up of resistors 27 and 29. The junction 31 of these two resistors is coupled to the input to the non-inverting terminal of comparator 25. This terminal is also coupled to ground through a capacitor 33. In the case of the positive threshold detector 23, the non-inverting input of a comparator 35 is coupled to voltage bus 15 and the Vout voltage is also coupled to a voltage divider made up of resistors 37 and 39 with a junction 41 therebetween. Resistor 39 has its other terminal coupled to Vbias. A capacitor 43 couples the junction 41 to ground. Junction 41 is coupled to the inverting input of comparator 35. Although not shown, comparator 35 is also coupled across the voltage Vbias and ground to provide its operating voltage.

The output of comparator 25 is coupled to a FET driver 45 and the output of the comparator 35 to a FET driver 47. Each of these FET drivers is also coupled between Vbias and ground as its operating voltage. The output of FET driver 45 is coupled to a FET switch 49 and the output of FET driver 47 to a FET switch 51. FET switch 49 has its source coupled to the capacitor 19 and its drain coupled to an inductor 53, the other side of which is coupled to the voltage bus 15. The terminal of the inductor 53 to which the drain of FET switch 49 is coupled is also coupled to the cathode of a diode 55, the anode of which is coupled to ground. FET switch 51 has its source coupled to ground and its drain coupled to a center tap of inductor 53. FET switch 49 has an internal diode 57 between its source and drain and FET switch 51 includes an internal diode 59 between its source and drain.

In operation, threshold detector 21 monitors power bus 15 for transients resulting in a voltage drop greater than a predetermined amount, e.g., −2% as compared to the average value of Vout. The monitoring is done by using the voltage divider made up of resistors 27 and 29 and capacitor 33. The values of the resistors are selected such that the voltage at junction 31, when Vout is at its full value, is 2% below Vout. This voltage value is temporarily stored in capacitor 33 which will retain that value when a transient occurs. If a transient results in the voltage Vout dropping below the 2% level, for example, the inverting input will drop below the non-inverting input and the output of comparator 25 goes high. In response to this, FET driver 45 provides a fast rise time, voltage gate to FET switch 49 which is an N-channel FET. FET switch 49 turns on connecting the voltage stored in capacitor 19 to one end of inductor 53. Inductor 53 limits the rise time of the current I1, flowing between capacitor 19 and voltage bus 15 through inductor 53, to a safe value. The value of I1 increases rapidly until it is equal to the load current transient on Vout. Through the use of the illustrated embodiment, the transient voltage Vout is clamped to a value of −2%, for example. When the power supply recovers from the transient and provides the new required current, Vout recovers and the output of comparator 25 goes low shutting off FET switch 49. Diode 55 suppresses the voltage spike on the drain of FET switch 49 due to the current changing in the inductor 53 when FET switch 49 turns off. The internal diode 57 of FET 49 may be sufficient to suppress this voltage.

While FET 49 switch is on, the inductor current I1 discharges capacitor 19. Since the voltage on capacitor 19 is much higher than Vout, e.g., 8–9 volts higher, capacitor 19 can be allowed to discharge several volts while FET 49 is on. This is in contrast to the situation where a capacitor is coupled to the Vout bus, as occurred in the prior art. In that case the discharge would have to be limited to 0.100 v. or less. Because, with the illustrated embodiment, it is possible to discharge several volts, the capacitance value of capacitor 19 can be much less than would be required if a capacitor were coupled directly to the Vout bus.

The embodiment of the present invention illustrated in FIG. 2 also includes the positive threshold detector 23 which monitors Vout bus 15 for Vout transients which cause the voltage to increase by a predetermined percentage, e.g., a percentage greater than 2%, as compared to the average or nominal value of Vout. In this case, the voltage Vout is coupled to the non-inverting input of comparator 35. Resistors 37 and 39 coupled in series between Vout and Vbias set a voltage which is coupled to the inverting terminal of the comparator 45 which is, for example, 2% above the nominal value of Vout. The capacitor 43 stores this value and maintains it during a transient. If the voltage Vout exceeds the preset difference, for example, 2%, the output voltage from comparator 35 drives FET driver 47 which turns on FET switch 51 during the transient. With FET switch 51 turned on, the current 12 in the path between Vout bus 15 and ground, which is conducted through a portion of inductor 53 and FET switch 51, increases until it is equal to the decrease in a load current in Vout. This current sinking limits the voltage overshoot of Vout to the predetermined value of, e.g,+2%. Coupling the current 12 through a portion of inductor 53 using the tap on inductor 53 limits the rise time of the current I2.

Thus, in each of the threshold detectors, one resistor of a voltage divider, i.e., resistor 27 or 37 is coupled to the bus, and the other, i.e., resistor 29 or 39 to a reference potential, ground in the case of resistor 29 and Vbias in the case of resistor 39.

Figure 3:
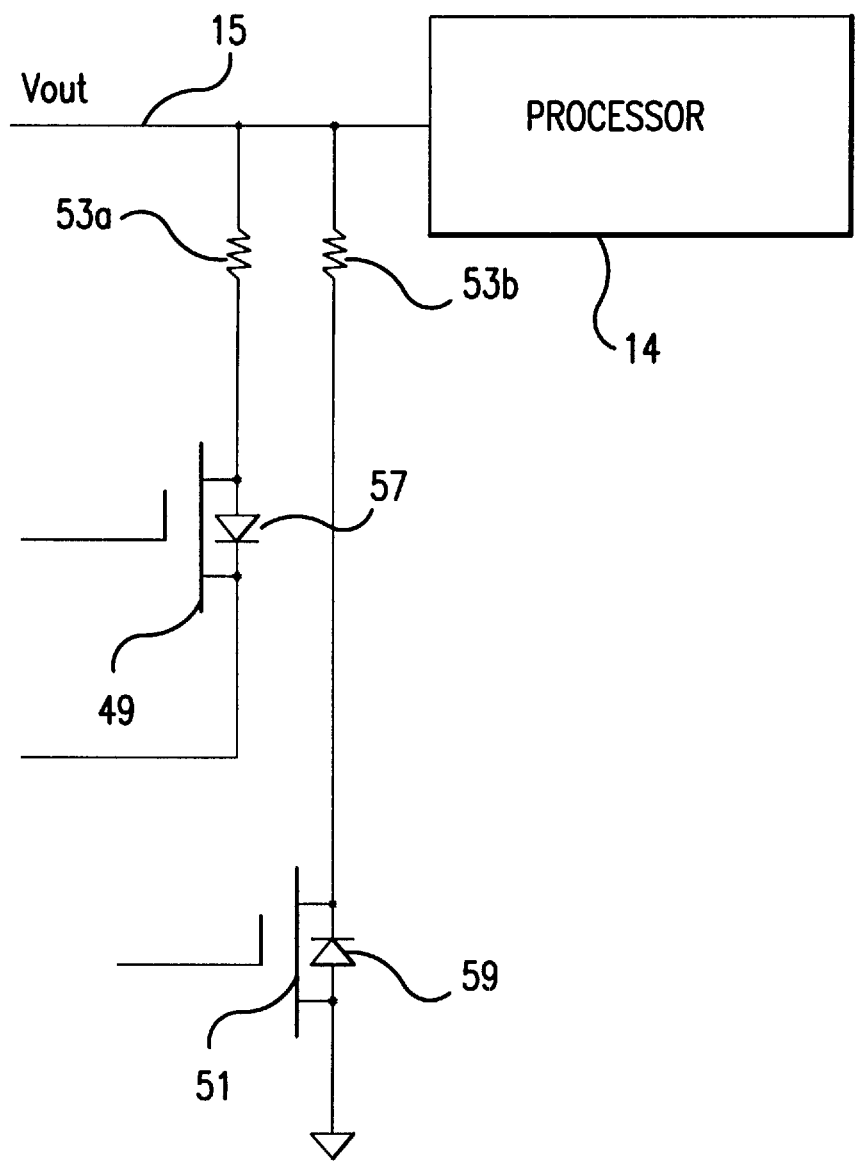
FIG. 3 illustrates an alternate embodiment of a portion of FIG. 2.

In the embodiment of FIG. 2, FETs 49 and 51 are coupled to the Vout bus by inductor 53. In an alternative embodiment shown in FIG. 3, inductor 53 is replaced by two resistors 53a and 53b and diode 55 is eliminated. Although this arrangement is more lossy, it can be implemented at a lower cost. Furthermore, in the illustrated embodiments, specific threshold detectors are illustrated. Other embodiments of threshold detectors could be used in place of these. In addition, although specific types of FET switches are shown, other types of switches for switching capacitor 19 to voltage bus 15 in response to a threshold detector output from threshold detector 21 or switching the bus 15 to ground in response to an output from threshold detector 23 may also be used. These and other modifications can be made without departing from the spirit of the invention which is intended to be limited solely by the appended claims.

What is claimed is:

1. A circuit to suppress transients on a bus, said bus carrying a first voltage having an nominal value comprising:
   a first threshold circuit to provide a first signal at an output when said first voltage deviates from said nominal value by more than the pre-determined amount;
   a source of current comprising a capacitor storing a second voltage having a value greater than said nominal voltage of said first voltage; and
   a first switch coupling said capacitor to said bus, said switch having a control input coupled to the output of said first threshold circuit.

2. A transient suppression circuit according to claim 1 wherein said source of current further includes a current source coupled to receive said second voltage as an input and providing a current output, said capacitor coupled to said current output.

3. A transient suppression circuit according to claim 2 wherein said predetermined amount is an amount below said nominal value and further including:
   a. a second threshold circuit providing an output when said first voltage deviates from its nominal value by more than a predetermined amount above said nominal value; and
   b. a second switch coupling said bus to ground, said switch having a control input coupled to the output of said second threshold circuit.

4. A transient suppression circuit according to claim 3 and further including an inductor coupled between said first switch and said bus, said inductor having a center tap, said second switch coupling said center tap to ground.

5. A transient suppression circuit according to claim 4 and further including a diode between said inductor and ground, said diode having its cathode coupled to said inductor.

6. A transient suppression circuit according to claim 3 and further including a first resistor coupled between said first switch and said bus, and a second resistor coupled between said second switch and said bus.

7. A transient suppression circuit according to claim 3 wherein said first and second threshold circuits each comprise:
   a. a comparator, with non-inverting and inverting inputs, having one of said inputs coupled to said bus;
   b. a voltage divider comprising third and fourth resistors in series having a junction therebetween, said junction coupled to the other input of said comparator, the third resistor of said voltage divider coupled to said bus and the fourth resistor of said voltage divider coupled to a reference potential; and
   c. a capacitor coupling said other comparator input to ground.

8. A transient suppression circuit according to claim 7 wherein said fourth resistor of the voltage divider of said first threshold circuit is coupled to ground and said fourth resistor of said second threshold circuit is coupled to said second voltage.

9. A transient suppression circuit according to claim 8 wherein said first and second switches comprise FET switches.

10. A transient suppression circuit according to claim 1 wherein said threshold circuit comprises:
   a. a comparator with non-inverting and inverting inputs, having one of said inputs coupled to said bus;
   b. a voltage divider comprising third and fourth resistors in series having a junction therebetween, said junction coupled to the other input of said comparator, said third resistor coupled to said bus and said fourth resistor coupled to a reference potential; and
   c. a capacitor coupling said other comparator input to ground.

11. A transient suppression circuit according to claim 10 wherein said fourth resistor of the voltage divider of said threshold circuit is coupled to ground.

12. A transient suppression circuit according to claim 10 wherein said fourth resistor of the voltage divider of said threshold circuit is coupled to said second voltage.

13. A transient suppression circuit according to claim 10 wherein said first switch comprises a FET switch having a gate forming its control input.

14. A transient suppression circuit according to claim 13 and further including a FET driver coupling the output of said threshold circuit to said gate.

15. A computer system comprising:
   a load;
   a power supply supplying a first voltage having a normal nominal value coupled to said load; and
   a dc power bus extending between said power supply and said load, said bus carrying said first voltage; and
   a transient suppression circuit for suppressing transients on said bus, comprising a first threshold circuit to provide a first signal at an output when said first voltage deviates from said nominal value by more than a pre-determined amount, a source capacitor storing a second voltage having a value greater than said nominal value of said first voltage, and a first switch coupling said capacitor to said bus, said switch having a control input coupled to the output of said first threshold circuit.

16. A computer system according to claim 1 wherein the power supply also has a second output supplying said second voltage and said source of current further includes a current source coupled to receive said second voltage as an input and providing a current output, said capacitor coupled to said current output of said current source.

17. A computer system according to claim 16 wherein said predetermined amount is an amount below said nominal value wherein said transient suppression circuit further comprises:
   a. a second threshold circuit providing an output when said first voltage deviates from its nominal value by more than a predetermined amount greater than said nominal value; and
   b. a second switch coupling said bus to ground, said switch having a control input coupled to the output of said second threshold circuit.

18. A computer system according to claim 17 wherein said first and second threshold circuits each comprise:
   a. a comparator with non-inverting and inverting inputs, having one of said inputs coupled to said bus;
   b. a voltage divider comprising first and second resistors in series having a junction therebetween, said junction coupled to the other input of said comparator, said first resistor coupled to said bus and said second resistor coupled to a reference potential; and
   c. a capacitor coupling said other comparator input to ground.

19. A computer system according to claim 18 wherein said second resistor of the voltage divider of said first threshold circuit is coupled to ground and said second resistor of said second threshold circuit is coupled to said second voltage.

20. A computer system according to claim 18 wherein said first and second switches comprise FET switches each having a gate forming its control input.

21. A computer system according to claim 20 and further including first and second FET drivers coupling the outputs of said first and second threshold circuits to said gates of said first and second switches.

22. A method of suppressing transients on a dc power bus extending between a power supply and a load, said bus carrying a first voltage having a nominal value comprising:
   a. charging a capacitor to a second voltage higher than said first voltage;
   b. detecting a first threshold when said first voltage deviates from its nominal value by more than a first predetermined amount; and
   c. coupling said capacitor to said bus in response to detecting said first threshold.

23. A method according to claim 22 wherein said predetermined amount is an amount below said nominal value and further including:
   a. detecting a second threshold a second predetermined amount above said nominal value of said first voltage; and
   b. coupling said bus to ground in response to detecting said second threshold.

24. A method according to claim 23 and further including limiting the rate of change of current flowing between said capacitor and said bus and between said bus and ground.

25. A method according to claim 24 and further including suppressing a voltage resulting from a change in the current flowing from said capacitor to said bus.

26. A method according to claim 25 wherein said steps of detecting a first threshold and a second threshold each comprise;
   a. deriving a reference voltage value from the nominal voltage on said bus and storing said voltage b. comparing the voltage on said bus with said reference value;

c. generating an output, to cause coupling of said bus to said capacitor and ground respectively, when the voltage on said bus deviates beyond said reference value.

27. A method according to claim 26 wherein said reference voltage for said first threshold is a value less than said nominal value of said first voltage and an output causing coupling of said bus to said capacitor is generated when the voltage on said bus drops below said reference voltage value for said first threshold.

28. A method according to claim 27 wherein said reference voltage for said first threshold is a value more than said nominal value of said first voltage and an output causing coupling of said bus to ground is generated when the voltage on said bus drops below said reference voltage value for said first threshold.

* * * * *

UNITED STATES PATENT AND TRADEMARK OFFICE
CERTIFICATE OF CORRECTION

PATENT NO. : 5,822,166

DATED : October 13, 1998

INVENTOR(S) :
HAROLD L. MASSIE

It is certified that error appears in the above-identified patent and that said Letters Patent is hereby corrected as shown below:

| | |
|---|---|
| Column 2, line 34 | "14 may" should be --14. Processor 14 may-- |
| Column 2, lines 38-39 | "computer system 13" should be --processor 14-- |
| Column 4, line 4 | "12" should be --I2-- |
| Column 4, line 9 | "12" should be --I2-- |
| Column 5, line 60 | after "source" insert --of current comprising a-- |
| Column 5, line 66 | "claim 1" should be --claim 15-- |

Signed and Sealed this

Eighth Day of February, 2000

Attest:

Q. TODD DICKINSON

Attesting Officer

Commissioner of Patents and Trademarks